Feb. 11, 1969  V. L. BALBI  3,426,715
REFUSE DISPOSAL SYSTEM AND APPARATUS
Filed Aug. 29, 1967
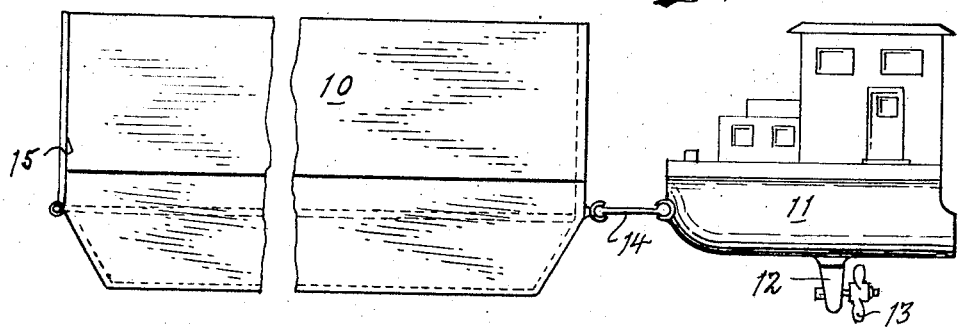
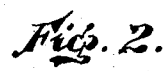
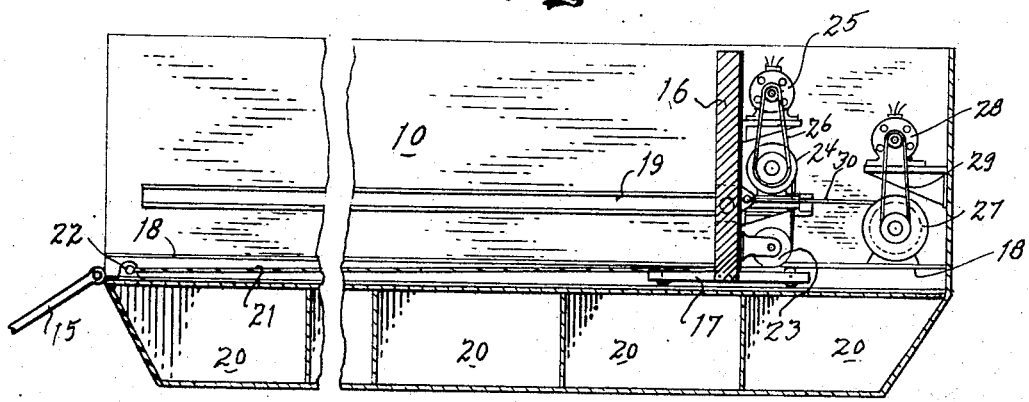
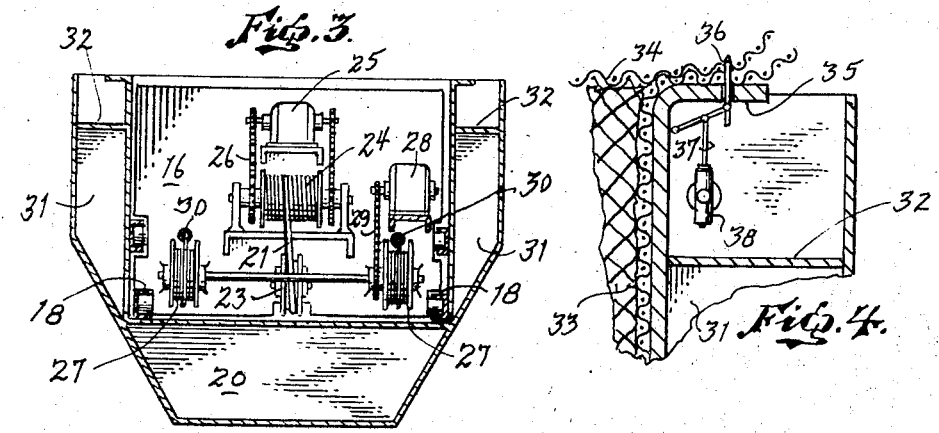
INVENTOR.
VALENTINO L. BALBI.
BY
*Wm H. Atkinson*
ATTORNEY

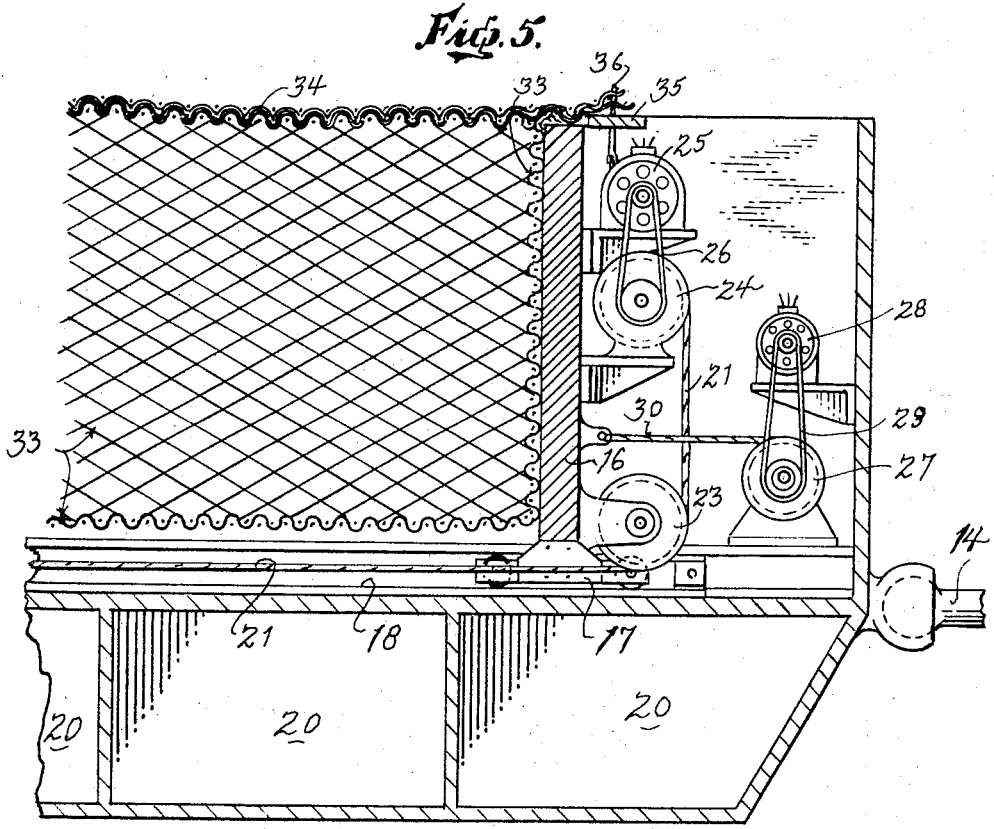

United States Patent Office 3,426,715
Patented Feb. 11, 1969

3,426,715
REFUSE DISPOSAL SYSTEM AND APPARATUS
Valentino L. Balbi, 52 W. Market St.,
Daly City, Calif. 94014
Filed Aug. 29, 1967, Ser. No. 664,003
U.S. Cl. 114—27                                    5 Claims
Int. Cl. B63b 35/30

ABSTRACT OF THE DISCLOSURE

This invention relates to an improved method and apparatus for the burial at sea of garbage and other refuse in a safe, economical and sanitary manner. It involves a special form of barge having a body portion with an open gate at one end and a traveling bulkhead for discharging the contents of the barge into the sea at a safe distance from the shore and in which the barge has a false or pontoon bottom which can be flooded to change the draft and trim of the barge as an assist in the discharge of the refuse at the burial point. To prevent the return of buoyant garbage and other refuse, such as empty containers, in the form of cans and bottles to an adjacent beach these are crushed and broken and the entire contents of the barge is contained as a unit by a wrapping of open mesh wire screen or other suitable material so packed and wetted as to insure a sinking thereof to the bottom of the sea.

---

My present invention relates to a refuse disposal and more particularly to a method and apparatus for disposing of garbage and refuse for burial at sea.

The primary object of my invention is to provide a new and improved disposal system for garbage and the like by which the garbage is buried at sea in a safe, sanitary and effective manner.

Other objects and advantages of my invention will be in part evident to those skilled in the art and in part pointed out in the following description taken in connection with the accompanying drawings wherein there is shown by way of illustration and not of limitation a preferred embodiment of the invention.

In the accompanying drawing:

FIGURE 1 is a side view showing a barge with propulsion means,

FIGURE 2 is a view of the barge partly in section and with the near side removed, FIGURE 3 is a sectional view with an end wall removed, FIGURE 4 is a fragmentary sectional view showing a detail, and FIGURE 5 is a somewhat larger view taken as a portion of FIGURE 2.

In the past, and at present, the generally accepted and more frequently used method of disposing of garbage and refuse is the so-called fill and cover system in which the garbage, etc., is dumped at a vacant area and then covered with fresh earth. However, due to the growth of suburbs and lack of space at the outskirts of the larger cities this method is being abandoned. The composting system is also not acceptable as it is costly to operate and results in obnoxious odors which cause many complaints. The more practical system is open burning, but this has its limitations as it produces the objectional and illegal smog. While the incineration system has and is now being given serious thought, it is found that to build a plant of this type to handle the amount of refuse of a large city would be very costly to build, operate and maintain. A difficulty with this latter system is that the refuse has to be pulverized before burning, and this still leaves about 15% of the refuse to be disposed of by other means.

It is therefore the object of my invention to provide a system and apparatus by which, having none of the above objectionable features and by which the refuse, etc., may be collected and disposed of by burial at sea in an effective, economical and sanitary manner.

For a more detailed description of my invention, both as to method and apparatus, reference is now made to the accompanying drawings wherein the numeral 10 designates generally a barge type vessel having a propulsion unit in the form of a modified tug 11 with a centralized propulsion means 12 and propeller 13. The tug 11 is here shown as connected to the barge preferably in pushing relation through a universal coupling 14 that will permit tilting of the barge as will hereinafter appear and while the tug 11 is here shown as a separate unit, it is understood that in some instances, particularly with a large barge, the propulsion unit may be incorporated as a unitary part thereof. The barge 10 has an open top with side and end walls forming a substantially rectangular compartment into which garbage and other refuse will be transported to a point of burial. One end of the barge 10 is closed with a water tight drop gate 15 that is adapted and arranged when opened to permit the complete discharge of the contents thereof.

As shown in FIGURE 2 of the drawings, the closed end of the refuse compartment of the barge 10 is defined by a traveling bulkhead 16 that is supported upon trolleys 17 which travel upon oppositely disposed channel rails extending along the refuse compartment of the barge 10. I may also provide channel-like guide rails 19 at the sides of the refuse compartment which will further serve to stabilize the bulkhead 16 as it moves in the refuse containing compartment of the barge to thus eject the refuse at the point of burial, as will be hereinafter pointed out. As an assist in the discharge of the refuse at this point the barge 10 is shown as also having a number of water tight compartments 20 between which any required balance between the amount of water and air therein may be varied by flooding one or more of the compartments and thus cause the gated end of the barge 10 to dip to a point where the refuse may be more easily moved and discharged as a unit by the operation of the bulkhead 16.

As shown in FIGURES 2 and 3 of the drawing, the above bulkhead 16 carries, as an integral part, its own propulsion or operating means which will operate to impart the required movement of the bulkhead as in discharging the refuse. This bulkhead operating means includes a cable 21 that is secured at a point 22 adjacent to the open end of the barge and which passes under a sheave 23 and to a cable collecting drum that is driven by an electric motor 25 through a chain drive 26. In this manner, when the bulkhead 16 is in the position as shown in FIGURE 2, a coiling of the cable 21 on the drum 24 will cause the bulkhead 16 to move toward the open end of the refuse compartment of the barge. When this occurs the refuse in the barge will be discharged at the open end thereof. Since the cable 21 can operate in only one direction in imparting movement to the bulkhead 16, I have shown the barge as also having two stationary cable recoiling drums 27 that are driven by an electric motor 28 through a chain drive 29. The drums 27 carry two retracting cables 30 that are connected to the bulkhead 16 and which operate to move the bulkhead 16 to the right as here viewed when the motor 28 is energized. It will be understood that during this bulkhead retracting movement the cable 21 will be paid out from the drum 24 as the retracting cables 30 are recoiled upon the drums 27, likewise during the recoiling of the cable 21 upon the drum 24 the cables 30 will be paid out from the drums 27. As shown in FIGURE 3, the body of the barge has compartments 31 extending along each side of its refuse hold for various auxiliary equipment, such as pumps and the like, and above these compartments 31 the barge 10 has open catwalks 32 in which members of the crew can operate as the barge is being loaded with refuse.

While it is believed that the construction and operation of the barge 10 as described above, together with its moving bulkhead 16 and the draft and trim pontoon compartments 20, will be clearly understood and for a further description of my invention particularly as to the proposed method for the burial of garbage and refuse at sea, my invention as pointed out above also contemplates a wrapping of the refuse and garbage in a suitable open mesh material as a compact bundle. In this wrapping of the refuse I may use conventional woven fencing wire or similar open mesh material having a width and length of sufficient dimensions to become wrapped around the refuse as it is being deposited in the refuse compartment of the barge 10.

In carrying out this refuse wrapping operation the refuse compartment of the barge 10 will first be lined with the open mesh material to form a net-like container that will be unattached from the bottom, sides and end walls of the refuse compartment so that this wrapping, together with the contained refuse, may be discharged from the barge as a compact unit. In some instances where the barge is of extreme length as, for example, up to 200 feet, this lining of the refuse compartment with the woven material may be divided up into several sections each of which may have an independent and complete wrapping as a unit.

Reference is now made to FIGURES 4 and 5 of the drawings where the sides and end walls of the barge 10 are indicated as lined with an open mesh fabric 33 with a further layer of similar material 34 laid over the refuse and secured about the upper edges thereof. For this operation the side walls of the barge 10 have an overhanging flange 35 with vertically extending pins 36 over which the mesh of the materials 33 and 34 may be placed during the initial bundle wrapping operation. This pin 36 is operated by a pneumatic or hydraulic piston 38 through a linkage system 37, and when extended as shown in FIGURE 4 the edges of the wrapping materials 33 and 34 may be held while they are being wired, clipped or otherwise fastened together. As stated above, and more clearly shown in FIGURE 5, the open mesh wrappings 33 and 34 when secured together and released from the pins 36 will form a compact mass which will form a bundle that will readily sink when discharged from barge 10.

At this point the question may be raised as to the economy of this operation and in defense thereof it is submitted that the expense compares very favorably with the costs of collecting and disposing of garbage by the various presently practiced methods which include a large fleet of pick-up trucks that must travel from the point of pick-up, for from ten to fifteen miles to an outlying disposal area or incinerator as the case may be, whereas in accordance with this invention the described practice will be found particularly advantageous and economical for seaboard metropolitan areas where the truck hauls from the pick-up point to a dockside pier with loading facilities for the barge will be comparatively short. While the docking at the pier forms no part of the present disclosure, it will be evident that with the barge 10, having an open top as shown and described, the dockside facility need only require platforms for the pick-up trucks from which the refuse may be dumped directly into the barge after it is prepared as described above.

While I have, for the sake of clearness and in order to disclose my invention so that the same can be readily understood, described and illustrated a specific form and arrangement with a method of operation, I desire to have it understood that this invention is not limited to the specific form disclosed, but may be embodied in other ways that will suggest themselves to persons skilled in the art.

Having thus described my invention, what I claim and desire to secure by Letters Patent is:

1. In a system for collecting garbage and refuse for burial at seat, the combination of a seagoing barge having a hold with an open top and one end closed by a water-tight gate forming a compartment into which collected garbage may be dumped, a bulkhead mounted for movement within said hold and forming a closure at the other end of said compartment, a disposable open mesh material extending over the bottom, side walls and ends of the compartment formed by said water-tight gate and said bulkhead into which the refuse dumped from the pick-up trucks is collected and wrapped as a compact bundle, and means for moving said bulkhead towards the open end of said compartment when said water-tight gate is opened, whereby said open mesh material with contained garbage will be discharged from said hold and into the sea as a bundle when said means is operated to move said bulkhead towards the open end of said compartment.

2. An apparatus for the collection and burial of refuse at sea, comprising a barge having a refuse collecting compartment with an open top and one end closed by a water-tight gate, said barge having water-tight pontoon compartments for varying the trim and draft of the barge, a bulkhead forming the other end wall of said refuse collecting compartment, said bulkhead being adapted and arranged for movement lengthwise within said refuse compartment and toward the open end of said compartment, means carried by said bulkhead for imparting movement thereto, said means being in the form of a cable coiling drum with a cable carried thereupon secured at the open end of said barge and extending under said bulkhead, whereby a coiling of said cable upon said drum will operate to move said bulkhead toward the open end of said compartment and discharge the collected refuse therefrom into the sea.

3. The invention as set forth in claim 2, characterized by the fact that said bulkhead is mounted upon trolleys moving between guide rails extending along the opposite sides of said refuse collecting compartment and is returned to its initial end wall forming position by a connected cable and cable recoiling drum mounted in a fixed position within the barge.

4. The method for disposal of garbage and refuse by burial at sea, which comprises collecting the garbage and refuse in the hold of a seagoing barge having an open top and open end closed by a water-tight gate, forming a lining about the interior walls of said hold with an open mesh material to form a disposable basket-like receptacle in said hold, dumping the collected garbage and refuse directly into said basket-like receptacle, closing the top of said basket-like receptacle with similar open mesh material to form a compact bundle, and finally discharging said bundle with the contained garbage and refuse into the sea, and characterized by the fact that said collected garbage and refuse together with said open mesh material will be in the form of a readily sinkable unit.

5. The method as set forth in claim 4, characterized by the fact that the open mesh material of said basket-like receptacle is of heavy metallic wire and forms a sinkable wrapping about the collected garbage and refuse for burial at sea.

References Cited

UNITED STATES PATENTS 1,401,623  12/1921  McClelland et al. ____ 114—35
3,211,308  10/1965  Glass _____ 214—82

TRYGVE M. BLIX, *Primary Examiner.*

U.S. Cl. X.R.

214—82